United States Patent
Pandit et al.

(10) Patent No.: US 11,334,757 B2
(45) Date of Patent: May 17, 2022

(54) SUSPECT DUPLICATE PROCESSING THROUGH A FEEDBACK-DRIVEN LEARNING PROCESS

(71) Applicant: International Business Machines Corporation, Armonk, NY (US)

(72) Inventors: Sushain Pandit, Austin, TX (US); Martin Oberhofer, Bondorf (DE); Joerg Rehr, Adendorf (DE); Ivan M. Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 16/005,411

(22) Filed: Jun. 11, 2018

(65) Prior Publication Data
US 2019/0377975 A1   Dec. 12, 2019

(51) Int. Cl.
| | | |
|---|---|---|
| *G06F 16/20* | (2019.01) | |
| *G06K 9/62* | (2022.01) | |
| *G06F 16/215* | (2019.01) | |
| *G06K 9/60* | (2006.01) | |
| *G06N 20/00* | (2019.01) | |

(52) U.S. Cl.
CPC ......... *G06K 9/6215* (2013.01); *G06F 16/215* (2019.01); *G06K 9/6263* (2013.01); *G06K 9/6267* (2013.01); *G06N 20/00* (2019.01)

(58) Field of Classification Search
CPC .................................................. G06F 16/215
See application file for complete search history.

(56) References Cited

U.S. PATENT DOCUMENTS

| | | | |
|---|---|---|---|
| 7,236,973 B2 | 6/2007 | Kalthoff et al. | |
| 7,386,578 B2 | 6/2008 | Fuerst | |
| 8,572,013 B1 * | 10/2013 | Nash ....................... | G06F 16/35 706/20 |
| 8,645,332 B1 | 2/2014 | Cohen et al. | |

(Continued)

FOREIGN PATENT DOCUMENTS

WO   2008000046 A1   1/2008

OTHER PUBLICATIONS

"Data Curation and Insight generation—IBM"; <https://researcher.watson.ibm.com/researcher/view_group.php?id=6268> Downloaded Mar. 26, 2018. pp. 1-4.

(Continued)

*Primary Examiner* — Kristopher Andersen
(74) *Attorney, Agent, or Firm* — Steven M. Bouknight

(57) ABSTRACT

Methods and apparatus, including computer program products, implementing and using techniques for processing suspect duplicate records in a master data management system. A master data management module identifies two or more suspect duplicate records in the master data management system based on scores. A matching engine classifies the two or more suspect duplicate records, by comparing the scores against threshold values, into one of: a match, a non-match, and a possible match. The master data management module re-classifies the suspect duplicate records and adjusting the threshold values of the matching engine for classification of future records, in response to receiving, by a data stewardship client, a user input indicating an incorrect classification of the suspect duplicate records.

4 Claims, 4 Drawing Sheets

(56) References Cited

U.S. PATENT DOCUMENTS

| | | |
|---|---|---|
| 9,582,555 B2 | 2/2017 | Kapadia et al. |
| 2007/0208574 A1 | 9/2007 | Zheng et al. |
| 2007/0214179 A1 | 9/2007 | Hoang |
| 2009/0063557 A1 | 3/2009 | MacPherson |
| 2010/0063948 A1 | 3/2010 | Virkar et al. |
| 2012/0072464 A1 | 3/2012 | Cohen |
| 2013/0073970 A1 | 3/2013 | Piantino et al. |
| 2013/0073972 A1 | 3/2013 | Yung et al. |
| 2013/0073976 A1 | 3/2013 | McDonald et al. |
| 2014/0019443 A1 | 1/2014 | Golshan |
| 2014/0089816 A1 | 3/2014 | DiPersia et al. |
| 2014/0101172 A1* | 4/2014 | Dua ................ G06Q 10/10 707/750 |
| 2015/0278241 A1 | 10/2015 | Bates-Haus et al. |
| 2018/0329957 A1* | 11/2018 | Frazzingaro ............ G06F 40/30 |
| 2019/0370388 A1* | 12/2019 | Li ................. G06F 16/90344 |

OTHER PUBLICATIONS

Held et al.; "Getting Data Right: Tackling the Challenges of Big Data Volume and Variety"; O'Reilly Media, Inc.; Sebastopol, CA; 2016; Tamr, Inc.; pp. 1-77.

IBM Watson Curator overview. IBM® IBM Knowledge Center, <https://www.ibm.com/support/knowledgecenter/en/SSSR99/com.ibm.icw.use.doc/curov000.htm> Downloaded Mar. 30, 2018. pp. 1-3.

* cited by examiner

Table 1. Suspect categories
| Match Category | Description |
|---|---|
| A1 | The parties are definitely the same. |
| A2 | It is highly probable that the parties are the same. |
| B | The parties are potentially the same. |
| C | The parties are definitely not the same. |
FIG. 1
(Prior Art)
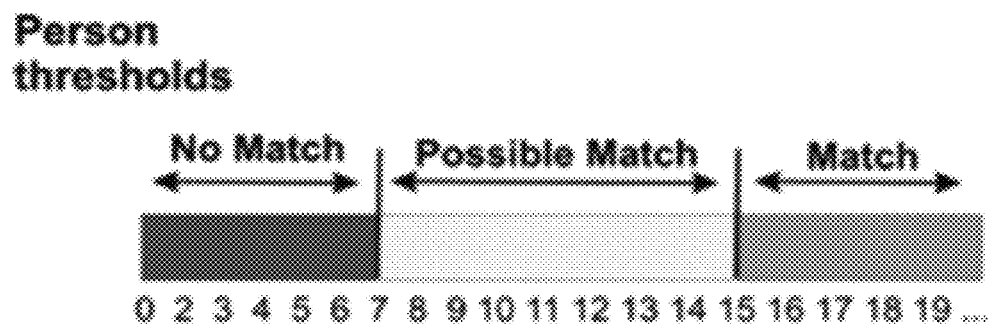
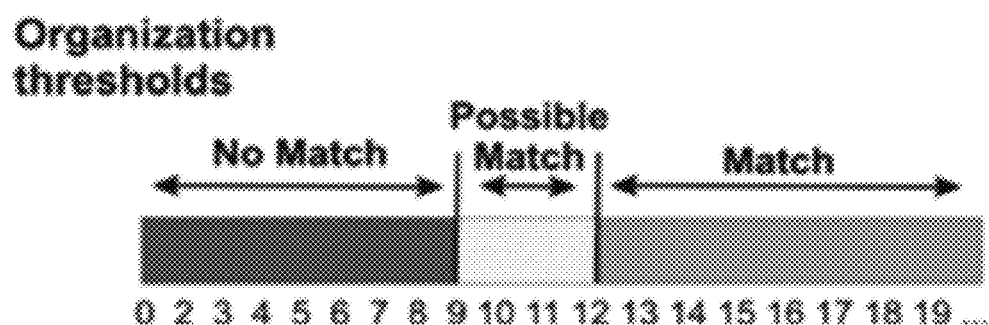
FIG. 2
(Prior Art)

| Critical data element | Party A | Party B |
|---|---|---|
| Given name one | Isabelle | Isabelle |
| Last name | Godbout | Lu |
| Date of birth | February 5, 1987 | February 5, 1987 |
| Social Security Number | 458 085 369 | 458 085 369 |
| Gender | Female | Female |

Both Party A and Party B are female and differ only in the Last Name critical data element, a data steward might make the assumption that the party changed her name, perhaps because of marriage, and then upgrade the suspected duplicate (A1).

| | Suspect type | Suspect status |
|---|---|---|
| Before adjustment | A2 | 1 - Under investigation. Party and suspect are duplicates. |
| After adjustment (upgrade) | A1 | Recommendation provided. Update the suspect party, for example. |

SUSPECT DUPLICATE PROCESSING THROUGH A FEEDBACK-DRIVEN LEARNING PROCESS

BACKGROUND

The present invention relates to Master Data Management (MDM) techniques, and more specifically, to suspect duplicate processing (SDP) and survivorship. MDM focuses on managing and interlinking reference data, also referred to as Master Data, which is shared by different systems and used by different groups within an organization. Some examples of Master Data include data about clients and customers, products, employees, inventory, suppliers, analytics and so on.

In a typical MDM system, SDP is a key process in ensuring the quality of party data and maintaining an accurate and trusted record for all parties across enterprise data sources and systems. SDP covers several different activities that are essential in identifying persons or organizations that may be duplicates of each other. Each time a person's or an organization's data changes, there is a possibility that an entry in the MDM system for that person or organization is potentially a duplicate of another person or organization.

As part of SDP, several steps are taken in a typical MDM system:

1) Matching is pre-configured (with thresholds that represent score totals).
2) Party data in source systems are profiled and analyzed and loaded into the MDM system.
3) Suspected duplicate candidates are searched and scored. The scoring can be based on a similarity of various attributes. For example, if there is a record for Person A with the attributes {name: Steve Smith, age: 35, address: Austin, Tex.} and a record for Person B with the attributes {name: Steve, age: 30+, address: TX}, then each attribute match will have a score assigned. For example, name match: 0.8, age match: 0.9, address match: 0.9, etc., leading to a high overall match score.
4) Suspects are identified and classified (based on total scores and comparison against thresholds set in step 1, resulting in match, non-match, or possible match). If there is a "close enough" match between two parties, each party is allocated a score and a corresponding suspect categorization. In many cases, a suspect record is created. In the case of a guaranteed match, the information might simply be merged to form a single master record.
5) Data stewards review suspected duplicates and create master records (or accept/reject/modify master records proposed by the MDM system).

In Step 3 above, a typical MDM system uses a mix of statistical and probabilistic engines to determine scores for party "proximity" and then compare those against pre-defined thresholds to determine whether the suspect is a match or not. For example, in the InfoSphere MDM implementation, which is available from International Business Machines Corporation of Armonk, N.Y., a combination of Classic and Probabilistic Matching Engines is used for these purposes. The MDM Classic engine has suspect match categories under which a computed score is classified, as schematically illustrated in FIG. 1, whereas the MDM Probabilistic engine has Person and Organizational thresholds against which a score is classified, as schematically illustrated in FIG. 2. It should be noted that these are just two examples of a traditional approach where master data is represented as attributes in relational and/or columnar databases. Some newer approaches represent master data entities as knowledge graphs, where the matching algorithm is based on network analysis on the knowledge graph.

In Step 4 above, the MDM system uses rules to use to automatically decide which record among two or more similar looking records should survive. For example, assume the following record exist:

Record A {name: Steve Smith, Age: 35}
Record B {name: Steven Smith, Age: 35, Address: Austin Tex.}
Record C {name: Steve}

In this situation, the system may have a pre-defined rule stating that the record with most attributes takes precedence. Thus, in this example, Record B would be the survivor.

However, no matter whether a classic or probabilistic approach is taken, there will typically be some records or entities that have some degree of similarity but are not sufficiently similar to warrant an auto-merge based on pre-defined survivorship rules. These records or entities have to be processed manually by data stewards as described in step 5, which is an expensive resource for enterprises today.

Further, as part of step 5, there are several manual sub-steps that may need to be taken by the data steward, such as:

a) Search and inquire for parties marked as suspected duplicates to better understand the basis.
b) Use suspect adjustment rules to override the detected suspect type categorization. In the above example, the steward could manually reject the MDM system's recommendation to keep record B and adjust the pre-defined rule used by the MDM system to state something else (e.g., that the record with the most descriptive Name field takes precedence instead of the one having the most attributes, etc.).
c) Merge parties together as part of a process known as merge or collapse.
d) Define survivorship rules for a merge operation.
e) Split parties to maintain both new/old parties as independent records, known as persistence.
f) Mark or unmark parties as suspected duplicates.
g) Refer to external/third party tools to establish what to do in steps d, e, and f.

As the skilled person realizes, there are several drawbacks associated with these conventional methods. For example, despite significant manual effort being spent in step 5 above, where a data steward defines survivorship rules manually and then performs merge or persist, there is effectively no learning being done as part of this process. There is also a considerable effort spent by the data stewards to ensure that survivorship rules stay consistent across the entire SDP. Further, there is no feedback loop from step 5 back to step 4 to help adjust the thresholds or categories indicated in FIGS. 1 and 2. Consequently, there is a need for improved MDM techniques.

SUMMARY

According to one embodiment of the present invention, methods, systems and computer program products are provided for processing suspect duplicate records in a master data management system. A master data management module identifies two or more suspect duplicate records in the master data management system based on scores. A matching engine classifies the two or more suspect duplicate records, by comparing the scores against threshold values, into one of: a match, a non-match, and a possible match. The master data management module re-classifies the suspect duplicate records and adjusting the threshold values of the matching engine for classification of future records, in response to receiving, by a data stewardship client, a user input indicating an incorrect classification of the suspect duplicate records The details of one or more embodiments of the invention are set forth in the accompanying drawings and the description below. Other features and advantages of the invention will be apparent from the description and drawings, and from the claims.

BRIEF DESCRIPTION OF THE DRAWINGS

FIG. 1 shows an example of suspect match categories in an MDM classic engine, in accordance with one embodiment.

FIG. 2 shows an example of suspect match categories in an MDM probabilistic engine, in accordance with one embodiment.

FIG. 5 shows two records and status of the records before and after adjustment, respectively, in accordance with one embodiment.

Like reference symbols in the various drawings indicate like elements.

DETAILED DESCRIPTION

The various embodiments of the invention pertain to techniques for improving SDP processes in an MDM system, by using semi-automatic learning techniques and adjusting the rules related to SDP and survivorship through a feedback-driven process. In one embodiment, the manual steps taken by a data steward during the review process are leveraged and used as an implicit feedback to adjust the thresholds and categories used during matching.

This learning approach results in a number of benefits, such as efficient use of the effort spent by the data steward during SDP, and gradual reduction of effort and time spent by the data steward as a result of introducing the learning and feedback loop features to automatically improve survivorship rules and matching thresholds. Various embodiments of the invention will not be described in further detail by way of example, and with reference to the figures.

Figure 3:
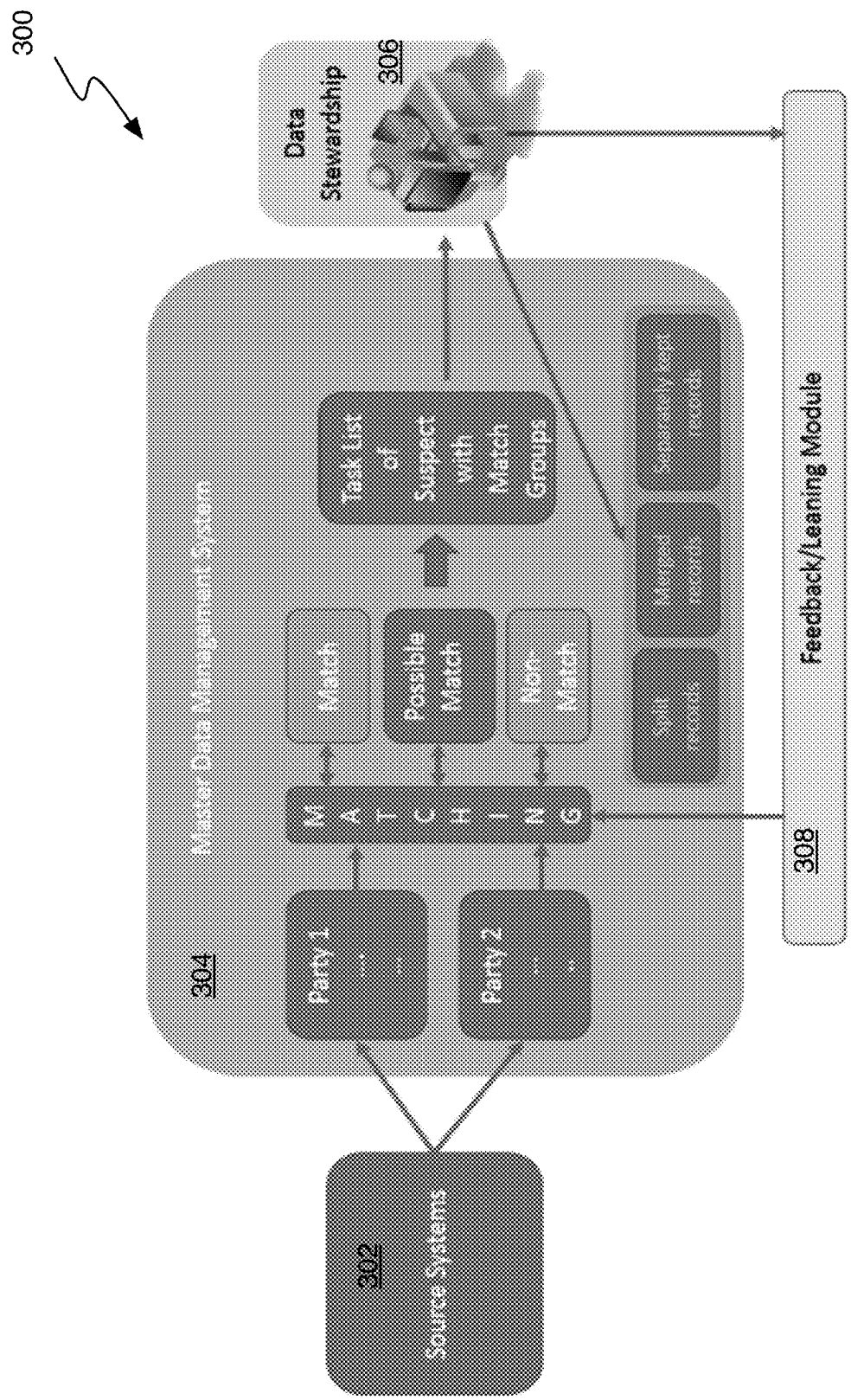
FIG. 3 shows an MDM system with a learning module, in accordance with one embodiment.

FIG. 3 shows an MDM system 300 in accordance with one embodiment of the invention. As can be seen in FIG. 3, the MDM system 300 includes one or more source systems 302, an MDM module 304, a data stewardship client 306, and a learning module 308. The source systems 302 contain the source data, e.g., records, that are to be matched by the MDM system 300. The MDM module 304 performs the SDP processing of records in conjunction with the data stewardship client 306. As can be seen in FIG. 3, two records, "Party 1" and "Party 2," respectively, are retrieved from the source system 302 to be examined by a matching engine. The result is either a "match," a "non-match," or a "possible match."

Candidates that form a "possible match" are placed in a task list from which a data stewardship client 306 can retrieve the candidates and present them to a data steward so she can make a determination as to whether to keep the records separately, or to merge the records as described above. The learning module 308 analyzes the interactions between the MDM module 304 and the data stewardship client 306 and provides feedback information to the matching component of the MDM module 304, which allows the MDM module 304 to make a more accurate decision about whether two records match or not.

Figure 4:
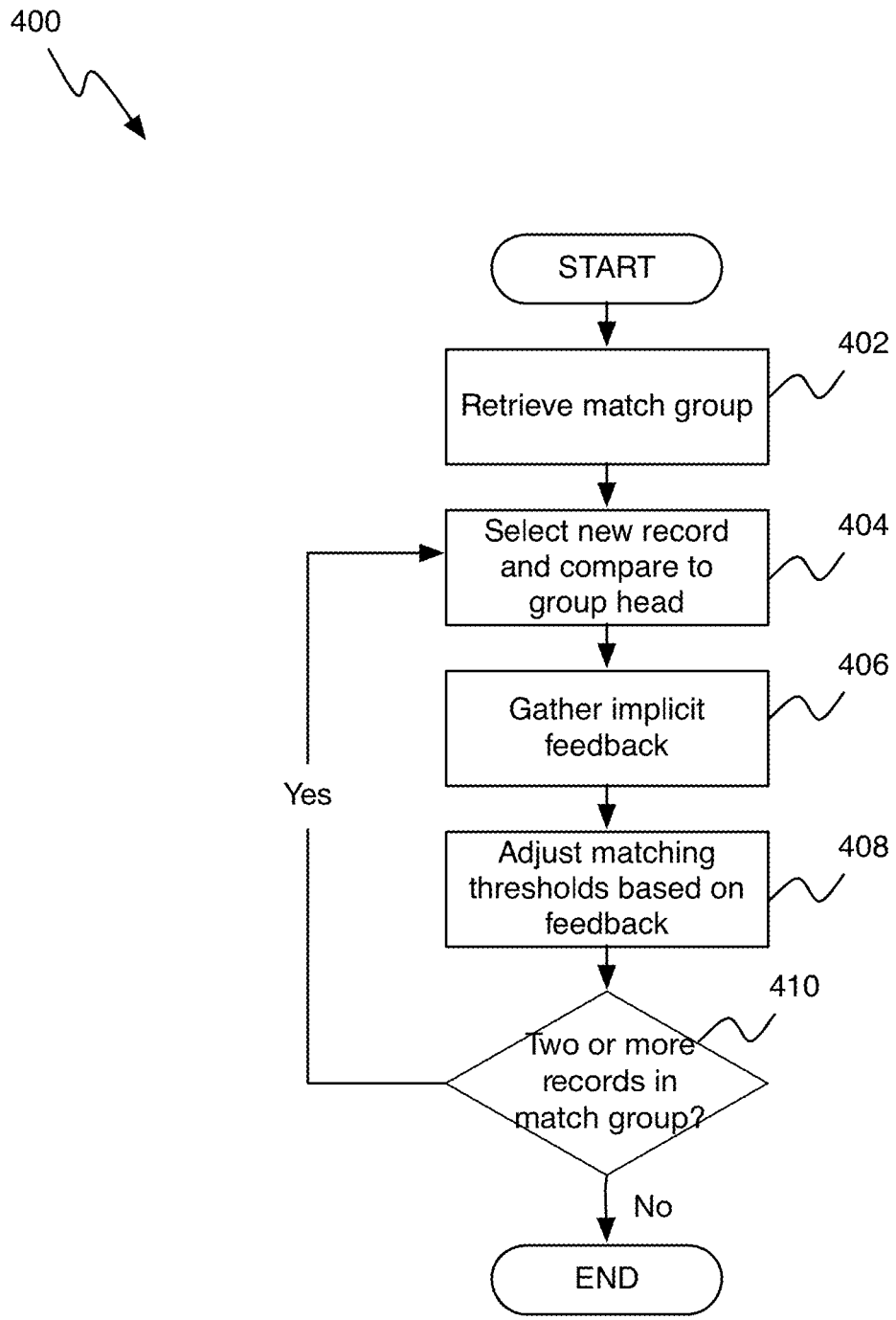
FIG. 4 is a flowchart showing a method for the MDM system of FIG. 3, in accordance with one embodiment.

FIG. 4 is a flowchart showing an SDP method 400 that is performed by the MDM system 300 in accordance with one embodiment of damage. As shown in FIG. 4, the method starts by the data steward client 306 retrieving a task from the MDM module 304, step 402. The task pertains to reviewing a match group, which includes two or more records, to determine whether any records are duplicates. One of the records in the match group is designated a group head, and another record from the match group is selected to be compared to the group head by the data steward, step 404. The data steward inspects why the matching engine has assigned the record to be a possible match. In some embodiments, proposed "certain matches" or proposed "no matches" can also be forwarded to the data steward for inspection instead of being taken care of automatically by the matching engine. The data steward now has several choices depending on which of the three outcomes was proposed by the matching engine. Some of the choices include:

Accepting the proposal from the matching engine and marking the record to be collapsed with the group head.

Rejecting the proposal from the matching engine and marking the record to be kept separate.

Using a suspect adjustment rule to reject/change the proposal from the matching engine.

Rejecting the proposal from the matching engine and marking the record to be never considered again in a match group with the same group head.

Based on data steward's actions and interactions with the user interface of the data stewardship client 306, the learning module 308 gathers implicit feedback, step 406, and adjusts thresholds in the matching layer accordingly, step 408. Steps 406 and 408 will be explained in greater detail below. However, as a general comment, implicit feedback-based learning models are slightly different from typical machine learning models in that the implicit feedback-based learning models are based on learning from weak feedback and user preference-based feedback instead of perfectly labelled test data. Some of these techniques are described in the following documents:

Research Statement: Machine Learning with Humans in the Loop: Karthik Raman www.cs.cornell.edu/~karthik/

Learning Socially Optimal Information Systems from Egoistic Users: Karthik Raman and Thorsten Joachims, ECML 2013, Prague, Czech Republic, September 2013

Structured Learning of Two-Level Dynamic Rankings: Karthik Raman, Thorsten Joachims and Pannaga Shivaswamy, CIKM 2011, Glasgow, Scotland, October 2011

Online Learning to Diversify from Implicit Feedback: Karthik Raman, Pannaga Shivaswamy and Thorsten Joachims, KDD 2012, Beijing, China, August 2012

The learning module 308 uses techniques that are similar to these implicit feedback learning models, but also introduces novel preferences and factors that are relevant to the specific problem at hand, as will be described in further detail below.

Next, the method checks whether there are any records besides the group head in the match group, step 410. If there are other records, the process returns to step 404 where a new record is selected, and the method proceeds as described above. If the only record left is the group head, then the process ends.

Learning Module Operations

The learning module 308 takes the outcome of a typical matching engine (i.e., Certain Match, No Match, Possible Match) and analyzes the actions the data steward takes with respect to survivorship rules and suspect adjustment rules. Based on the analysis, the learning module 308 captures novel preferences and relevant factors and uses implicit feedback-based learning models to adjust the matching thresholds of the matching engine.

In one embodiment, each of the three possible suggestions provided by the matching engine (i.e., a proposed certain match, a proposed probable match, and a proposed no match) is handled differently by the learning module 308, which will now be described in further detail.

Proposed Certain Match

Examples of proposed certain matches are when an MDM classic engine classifies a match as "A1" in FIG. 1, or when an MDM probabilistic engine provides a score of 15 or more for a person in FIG. 2.

When encountering a proposed certain match, the learning module 308 considers the following two scenarios that may be taken by the data steward, using the data stewardship client 306.

a) The data steward accepts the proposed master copy.
b) The data steward uses a suspect adjustment rule to reject/change the decision.

If the data steward accepts the proposed master copy (i.e., scenario "a" above), no action is taken around the thresholds, as the thresholds are performing well. However, the following actions are taken with respect to survivorship:

If the data steward accepts default survivorship rule, no action is taken.

If the data steward, on the other hand, changes survivorship rules to intentionally persist both of the A1 matched parties, the learning module 308 asks the data steward for further input in order to understand how to propagate the changes that were made to the survivorship rules. The learning module 308 can provide the data steward with, for example, a list of related survivorship rules (for example, across other lines of business) and prompt the data steward to select the survivorship rules that should be overridden by the new changed survivorship rules. Based on the input from the data steward, the new survivorship rules are established and made consistent automatically. This can be achieved, for example, by triggering respective MDM transactions to update rules/suspect statuses.

Similarly, if the data steward changes survivorship rules to explicitly collapse parties, overriding an enterprise-wide A1 rule, then the learning module 308 asks the data steward for further input to understand how to propagate changes. This can be done in a manner similar to what was described in the previous paragraph.

When the data steward uses a suspect adjustment rule to reject/change the decision (i.e., scenario "b" above), then the UI Focus/Time-Spent is analyzed, and the extent of external help required is analyzed as follows.

If the data steward spent little time reviewing the records compared to the average time that she takes to review, before rejecting the proposed master copy, this is indicative that the thresholds are performing poorly (since it was a quick/easy decision for the data steward to make) and need adjustment for sure. A score, which may be a function of time (e.g., number of seconds spent*0.1) can be assigned to represent this. Thus, a low score in conjunction with a rejection of a proposal would be indicative that the thresholds are performing poorly, whereas a low score in conjunction with acceptance of a proposal would be indicative that the thresholds are performing well.

In contrast, if the data steward spent a long time in reviewing the parties, compared to the average time that she takes to review, before rejecting the proposed master copy, this is indicative that the thresholds are not at their optimum because the data steward did eventually reject the suggestion made by the system. However, it did take the data steward a long time to come to this conclusion, meaning that it was a difficult matching scenario. However, this could also be a one-off edge case that was hard to match automatically. The threshold may need adjustment, but it does not need to happen immediately.

In the illustrated embodiment, the learning 308 module keeps track of the widgets on the stewardship user interface (UI) of the data stewardship client 306. For example, if a core party details widget was accessed and an action was taken immediately afterwards, then a reasonable assumption can be made that the core party details widget was instrumental in assisting the data steward in making the decision. In the illustrated embodiment, each widget on the data stewardship client 306 has a pre-assigned abstraction score, which represents the level of granularity the information content represented by the widget. For example, on a scale of 1-10, a widget that includes the core properties of a party may have a lower abstraction score of 2-3, while a widget that includes the extended properties or "360-degree view," would have a higher abstraction score of 8-9.

If the data steward consults an external informational resources before rejecting the proposed master copy, that is indicative of the fact that the thresholds may be performing well based on the data they had, and this is a one-off edge case. A score (0-9) is assigned to represent the extent of external info used. For example, a high score may indicate that a significant amount of external information was used.

The learning module 308 computes a weighted score considering all the factors above and feeds back to the matching layer to adjust the thresholds in step 408. One way to compute the weighted score for scenarios "a" and "b," respectively, is as follows:

$$W\_match=(k\_1*f\_1+k\_2*f\_2+k\_3*f\_3)$$

where f_i are the scores described in the preceding paragraphs, and k_i are pre-defined constants, typically in the range [0, 1], used to normalize these scores. W_match is then used to adjust the thresholds in the matching layer. Typically this occurs after each action taken by the data steward, but as the skilled person realizes, in some embodiments, this may also occur less frequently.

Proposed Probable Match

Examples of proposed probable matches are when an MDM classic engine classifies a match as "A2" or "B" in FIG. 1, or when an MDM probabilistic engine provides a score in the range 7-14 for a person in FIG. 2.

If the data steward invokes a suspect adjust rule, in order to change a probable match to a guaranteed duplicate (that is, changing the classification from A2 to A1), the learning module 308 prompts the data steward to pick a reason that led to this decision. Examples of such reasons include:

One of the party fields (implies matching thresholds did not do ok and need adjustment).
External tool reference (implies matching thresholds are not bad but may need some adjustment).
Undirected search, for example, on the Internet (implies matching thresholds did ok).

For instance, consider the following example with reference to FIG. 5 where Party A is compared to Party B. Both Party A and Party B are female and differ only in the last name (which is a critical data element), and the suspect type before adjustment is therefore A2. When examining the records, the data steward might make the assumption that Party A changed her last name—perhaps because of marriage—and then upgrade the suspect type to A1 (i.e., a certain match).

As the suspect type upgrade is based on a critical data element (first column), the matching engine should be adjusted, because these fields were not appropriately considered by the matching engine. If the suspect type upgrade was not based on a critical data element, then data steward must have referred to some other reference (e.g., an information tool, or done an undirected search on the Internet). Consequently, an appropriate score is assigned to reflect this. For example, in one embodiment more critical data elements can be assigned higher scores. For example, an enterprise information tool can be assigned a score of 8, a web search can be assigned a score of 5, etc.

Similar to the case with a certain match described above, the learning module 308 computes a weighted score considering the steps above and provides a feedback to the matching layer of the MDM module 304 to adjust the thresholds. For example, a weighted score can be computed as:

$$W\_no\_match = k\_4 * f\_4 + \ldots$$

where f_i are the scores is k_i are pre-defined constants to normalize the scores, as described above.

W_no_match is then used to continually adjust the thresholds in matching layer.

Proposed No Match

An example of a proposed "no match" is when an MDM classic engine classifies a match as "C" in FIG. 1, or when an MDM probabilistic engine provides a score in the range 0-6 for a person in FIG. 2.

When encountering a proposed no match, the learning module 308 uses an approach similar to what was described above for a proposed certain match to compute a weighted cumulative score and use that score to adjust matching thresholds, as well as propagate any survivorship rule changes throughout the MDM system 300 (rules for other lines of business, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training a master data management system comprising a user interface and machine learning to process suspect duplicate records in the master data management system, the method comprising:

implementing, by the computer, one or more suspect classification rules associated with the master data management system;

identifying, by the computer, two or more suspect duplicate records in the master data management system based on scores;

using, by the computer, the one or more suspect classification rules to classify the two or more suspect duplicate records by comparing the scores against threshold values, and based on the comparison, classifying the two or more suspect duplicate records into one of: a match, a non-match, and a possible match;

in response to determining the classification of the two or more suspect duplicate records are a match, detecting acceptance or rejection of the determined match, in response to detecting acceptance of the determined match, implementing one or more survivorship rules for determining whether at least one of the two or more suspect duplicate records survives, wherein implementing the one or more survivorship rules comprises:

determining whether at least one survivorship rule associated with the one or more survivorship rules is accepted or adjusted based on the determined match;

in response to a determination that the at least one survivorship rule is adjusted, using the machine learning model to automatically generate a list of related survivorship rules corresponding to the at least one survivorship rule; and based on a detected selection of related survivorship rules from the list of related survivorship rules, automatically propagating changes to the selection of the related survivorship rules based on the adjustment to the at least one survivorship rule;

in response to detecting rejection of the determined match, generating a first score based on a detected time spent by a user reviewing the two or more suspect duplicate records, and generating a second score based on a determination of whether external information is used to reject the determined match, wherein generating the first score comprises using user interface (UI) focus to detect user interactions on the user interface and detecting the time spent between the user interactions, and wherein generating the second score comprises scoring specific components on the user interface and detecting the user interactions on the specific components; and using the generated first score and the generated second score as input in an algorithm to calculate a weighted score for adjusting the threshold values for classifying the two or more suspect duplicate records.

2. The method of claim 1, wherein the two or more suspect duplicate records form a match group and wherein one record of the match group is designated a group head, against which group head other records in the match group are compared.

3. A computer program product for training a master data management system comprising a user interface and machine learning to process suspect duplicate records in the master data management system, the computer program product comprising a computer readable storage medium having program instructions embodied therewith, wherein the computer readable storage medium is not a transitory signal per se, the program instructions being executable by a processor to perform a method comprising:

implementing, by the computer, one or more suspect classification rules associated with the master data management system;

identifying, by the computer, two or more suspect duplicate records in the master data management system based on scores;

using, by the computer, the one or more suspect classification rules to classify the two or more suspect duplicate records by comparing the scores against threshold values, and based on the comparison, classifying the two or more suspect duplicate records into one of: a match, a non-match, and a possible match;

in response to determining the classification of the two or more suspect duplicate records are a match, detecting acceptance or rejection of the determined match, in response to detecting acceptance of the determined match, implementing one or more survivorship rules for determining whether at least one of the two or more suspect duplicate records survives, wherein implementing the one or more survivorship rules comprises:

determining whether at least one survivorship rule associated with the one or more survivorship rules is accepted or adjusted based on the determined match;

in response to a determination that the at least one survivorship rule is adjusted, using the machine learning model to automatically generate a list of related survivorship rules corresponding to the at least one survivorship rule; and based on a detected selection of related survivorship rules from the list of related survivorship rules, automatically propagating changes to the selection of the related survivorship rules based on the adjustment to the at least one survivorship rule;

in response to detecting rejection of the determined match, generating a first score based on a detected time spent by a user reviewing the two or more suspect duplicate records, and generating a second score based on a determination of whether external information is used to reject the determined match, wherein generating the first score comprises using user interface (UI) focus to detect user interactions on the user interface and detecting the time spent between the user interactions, and wherein generating the second score comprises scoring specific components on the user interface and detecting the user interactions on the specific components; and using the generated first score and the generated second score as input in an algorithm to calculate a weighted score for adjusting the threshold values for classifying the two or more suspect duplicate records.

4. The computer program product of claim 3, wherein the two or more suspect duplicate records form a match group and wherein one record of the match group is designated a group head, against which group head other records in the match group are compared.

* * * * *